United States Patent
Rutten

(10) Patent No.: US 7,028,660 B2
(45) Date of Patent: Apr. 18, 2006

(54) METHOD FOR IMPROVING THE TORQUE BAND IN A MULTICYLINDER FOUR-CYCLE PISTON ENGINE

(75) Inventor: Oliver Rutten, Köln (DE)

(73) Assignee: FEV Motorentechnik GmbH, Aachen (DE)

(*) Notice: Subject to any disclaimer, the term of this patent is extended or adjusted under 35 U.S.C. 154(b) by 0 days.

(21) Appl. No.: 11/040,476

(22) Filed: Jan. 24, 2005

(65) Prior Publication Data

US 2005/0166888 A1    Aug. 4, 2005

Related U.S. Application Data

(63) Continuation of application No. PCT/EP03/007915, filed on Jul. 19, 2003.

(30) Foreign Application Priority Data

Jul. 23, 2002    (DE) ................ 102 33 284

(51) Int. Cl.
    *F02B 77/00*    (2006.01)

(52) U.S. Cl. .................................. 123/198 F
(58) Field of Classification Search .......... 123/198 F
    See application file for complete search history.

(56) References Cited

U.S. PATENT DOCUMENTS

| | | | |
|---|---|---|---|
| 4,556,026 A | 12/1985 | Masuda et al. | |
| 4,584,974 A * | 4/1986 | Aoyama et al. | ......... 123/198 F |
| 4,608,952 A | 9/1986 | Morita et al. | |
| 5,368,000 A | 11/1994 | Koziara | |
| 5,562,086 A | 10/1996 | Asada et al. | |
| 6,332,445 B1 | 12/2001 | Voss et al. | |

* cited by examiner

*Primary Examiner*—Noah P. Kamen
(74) *Attorney, Agent, or Firm*—Venable LLP; Robert Kinberg; Steven J. Schwarz

(57)  ABSTRACT

A method for improving the torque band of a multi-cylinder, four-cycle piston internal combustion engine comprising at least two cylinder pairs including variably triggered gas exchange valves, wherein each cylinder pair comprises two cylinders associated with each other by a firing interval of 360° crank angle, and wherein one cylinder pair is not fired by cutting off the fuel supply and acting upon the gas exchange valves resulting in a partial load operation. The method includes triggering the cylinders of the non-fired cylinder pair during the partial load operation so that such cylinders take in a predetermined charge quantity for adjusting a predetermined compression level that influences the torque band. The gas exchange valves of the non-fired cylinders are maintained closed for the duration of the partial-load operation and the associated gas intake valve and/or gas discharge valve is opened only briefly solely to influence the charge quantity during the piston passage through bottom dead center.

8 Claims, 4 Drawing Sheets

Fig. 3

| exhaust gas compression | cycle | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| | cyl. 1 | K | E | A | S | K | E | A | S | K | E | A | S | K | E | A | S | K | E | A |
| | cyl. 2 | E | A | S | K | E | k | e | k | e | k | e | k | e | A | S | K | E | A | S |
| | cyl. 3 | S | K | E | A | AS | k | e | e | e | k | k | e | e | k | e | A | E | K | E |
| | cyl. 4 | A | S | K | E | A | S | K | E | A | S | K | E | A | S | K | E | A | S | K |
| | sine | 0 | 0 | 0 | 0 | 0 | - | + | - | + | - | + | - | + | - | + | 0 | 0 | 0 | 0 |

Fig. 4

| air compression | cycle | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| | cyl. 1 | K | E | A | S | K | E | A | S | K | E | A | S | K | E | A | S | K | E | A |
| | cyl. 2 | E | A | S | K | E | A | S | k | e | k | e | k | e | A | S | K | E | A | S |
| | cyl. 3 | S | K | E | A | S | k | e | e | e | k | k | e | e | k | e | A | E | K | E |
| | cyl. 4 | A | S | K | E | A | S | K | E | A | S | K | E | A | S | K | E | A | S | K |
| | sine | 0 | 0 | 0 | 0 | 0 | - | + | + | + | - | + | - | + | - | + | 0 | 0 | 0 | 0 |

<----cut-off cylinders 2 and 3 ---->

US 7,028,660 B2

METHOD FOR IMPROVING THE TORQUE BAND IN A MULTICYLINDER FOUR-CYCLE PISTON ENGINE

This application is a continuation of International Application No. PCT/EP03/007915 filed on Jul. 19, 2003, designating the United States and claiming priority based on German Application 102 33 284.3 filed on Jul. 23, 2002. The disclosures of both of the foregoing applications are incorporated herein by reference.

BACKGROUND OF THE INVENTION

A cylinder cut-off is one option for improving the fuel consumption of a piston internal combustion engine operating at partial-load. With this mode of operation, the fired cylinders operate at a higher load point while the non-fired cylinders are carried along. Depending on the internal combustion method used and the load control, the consumption advantage achieved as a result of the indicated thermal efficiency which increases with the load can be measured.

The so-called cylinder cut-off has already been realized in piston internal combustion engines with a higher number of cylinders, e.g. 12 cylinders. The changing course of the torque band resulting from the cylinder cut-off is frequently still acceptable when using a higher number of cylinders. Whereas with three-cylinder engines, for example, acceptable torque band shapes can still be achieved at high engine speeds, owing to the excess weight of the mass forces relative to the gas forces, the influence of the gas forces relative to the mass forces is predominant at the low speed range, so that the torque band shapes observed at the low speed range are no longer acceptable.

SUMMARY OF THE INVENTION

Because cutting off cylinders at engine speeds and at low load can basically result in a considerable reduction of fuel consumption, it is an object of the present invention to create a method for improving the torque band during such cylinder cutoff which results in an improved torque band for at least the four-cylinder, four-cycle piston internal combustion engines, but also for engines with higher cylinder numbers.

The above and other objects are accomplished according to the invention by the provision of a method for improving the torque band of a multi-cylinder, four-cycle piston internal combustion engine comprising at least two cylinder pairs including variably triggered gas exchange valves, wherein each cylinder pair comprises two cylinders associated with each other by a firing interval of 360° crank angle, and wherein one cylinder pair is not fired by cutting off the fuel supply and acting upon the gas exchange valves resulting in a partial load operation, the method comprising: triggering the cylinders of the non-fired cylinder pair during the partial load operation so that the cylinders of the non-fired cylinder pair take in a predetermined charge quantity for adjusting a predetermined compression level that influences the torque band; and maintaining the gas exchange valves of the non-fired cylinders closed for the duration of the partial-load operation and opening only briefly at least one of the associated gas intake valve or gas discharge valve solely to influence the charge quantity during the piston passage through bottom dead center.

The effect of the method according to the invention is that the charge quantity respectively taken in by the non-fired cylinders while the gas exchange valves remain closed act in the manner of a preloaded spring, meaning it is compressed during a piston movement from the bottom dead center to the top dead center and expands again while the piston moves from the top dead center to the bottom dead center, thus releasing work output to the piston.

A four-cylinder, four-cycle engine, for example, has the advantage that because the cylinders of the individual cylinder pairs are assigned to each other by selected firing interval of 360° crank angle, both cylinders of the non-fired cylinder pair, meaning the cut-off cylinder pair, are assigned to the compression stroke of respectively one fired cylinder of the "working" cylinder pair, for which the effect of the "preloaded spring" on the piston moving from the top dead center to the bottom dead center becomes effective, thus supporting the charge compression in the fired cylinder by introducing a corresponding, positive torque component.

During a partial-load operation over a longer period of time, it is advantageous if, depending on the mode of operation as explained in further detail below, the respectively associated gas intake valves or gas discharge valves for the non-fired cylinders are opened briefly when the piston passes through the bottom dead center, so as to influence the charge quantity that is taken in, for example for compensating blow-by losses. With a predetermined optimum charge quantity, the aforementioned supporting effect can therefore be maintained through compression and expansion in the non-fired cylinders while the gas-exchange valves remain closed.

In particular for piston internal combustion engines having fully variable controlled gas exchange valves, e.g. gas exchange valves that can be triggered via electromagnetic actuators and can be triggered via the engine control unit, one advantageous embodiment of the method according to the invention provides that the predetermined charge quantity is adjusted in dependence on the load and/or the speed and/or the torque band by correspondingly triggering the gas exchange valves while the piston passes through the bottom dead center, thus providing the option of optimizing the torque band for different partial load ranges and/or different speed ranges. The partial load ranges and/or speed ranges taken into consideration here can be stored in the engine control unit, for example in the form of performance characteristics. It is advantageous if the actual torque band is detected, e.g. by means of a sensor assigned to the crank shaft, and is then taken into consideration as actual value along with a predetermined desired value that can also be stored in the form of a performance characteristic. It can be useful in this case to provide tolerance zones for the desired value, so that constant corrections are not necessary.

The respectively charge quantity that must be predetermined for the non-fired cylinders can be generated from the exhaust gas or through the intake of fresh air.

If exhaust gas is used for the charge quantity, then the gas discharge valves of the non-fired cylinders must respectively be triggered while the gas intake valves remain closed.

If fresh air is used for the predetermined charge quantity, the gas intake valves of the non-fired cylinders must correspondingly be triggered while the gas discharge valves remain closed.

Depending on whether exhaust gas or fresh air is selected for the predetermined charge quantity, corresponding method steps must be provided for a quick reacting transition of the gas exchange valves from the partial-load operation to the full-load operation when the non-fired valves are added. These method steps are listed in the dependent claims and described in further detail below.

BRIEF DESCRIPTION OF THE DRAWINGS

The invention is explained in further detail with the aid of schematic drawings which follow.

FIG. 3 is a diagram showing the cutting-off and firing up of two cylinders at gas compression of a four-cylinder engine.

FIG. 4 is a diagram corresponding to the diagram in FIG. 3 for air compression.

DETAILED DESCRIPTION OF THE INVENTION

Figure 1:
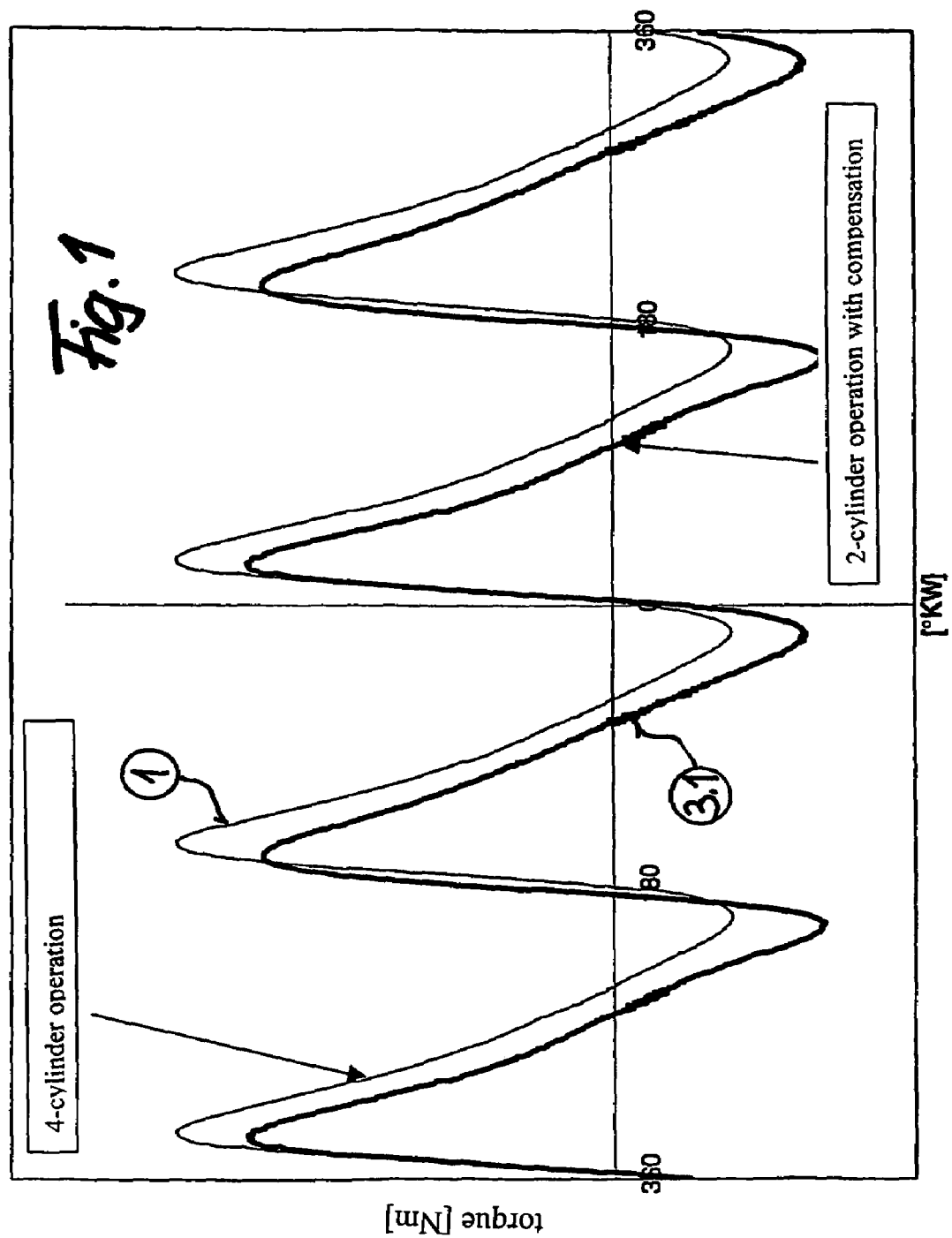
FIG. 1 is a diagram of a torque band in dependence on the crank angle degree for a four-cylinder engine during the full-load operation and during the operation with cylinder cut-off.

The curve 1 in FIG. 1 shows the torque band during the full-load operation—meaning when all four cylinders are fired up—of a four-cylinder, four-cycle piston internal combustion engine having two cylinder pairs that are respectively assigned to each other by firing interval of 360°, for example with the firing sequence 1–3–4–2 or 1–2–4–3.

Figure 2:
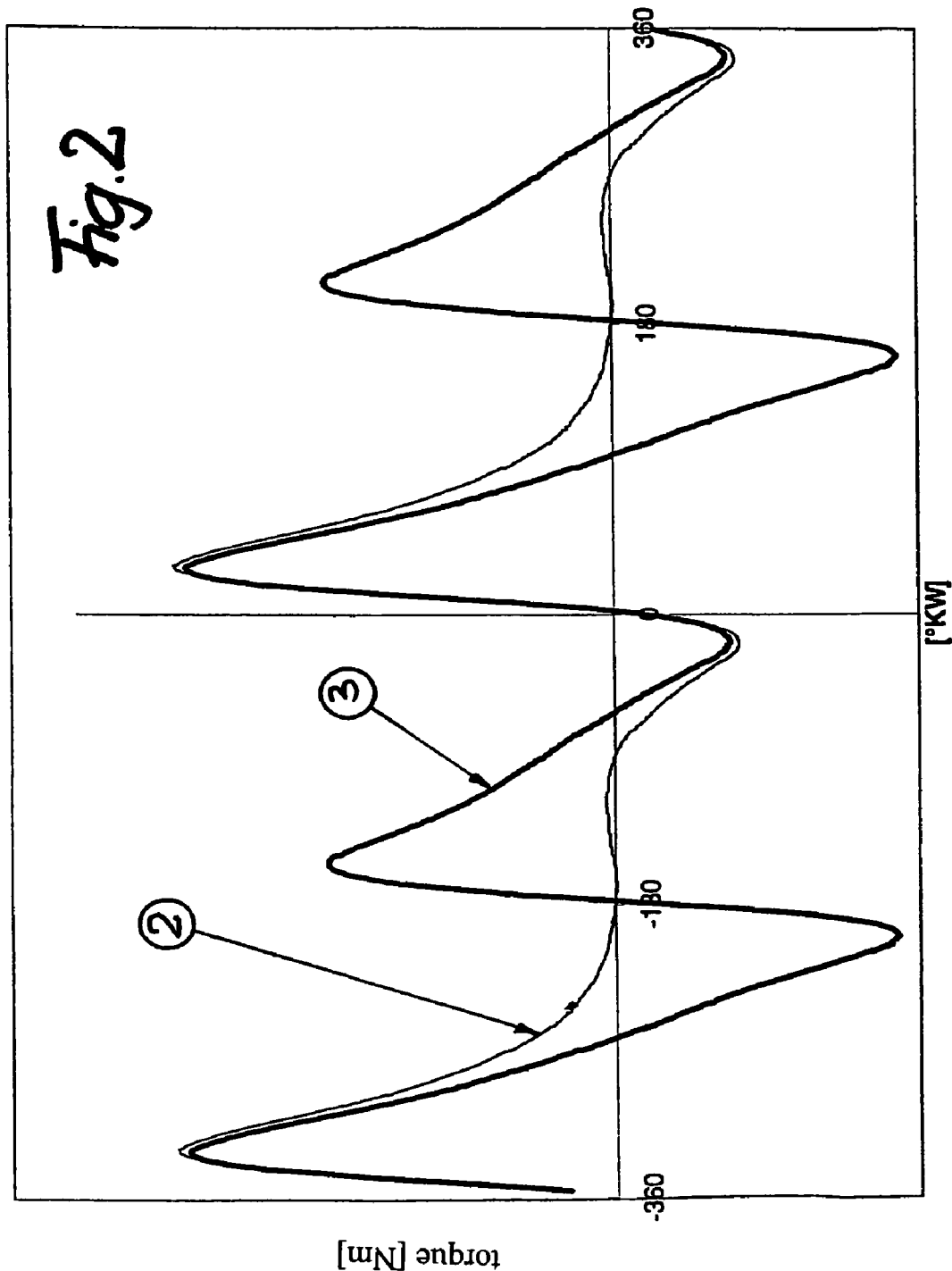
FIG. 2 is a diagram of a torque band in dependence on the crank angle degree for a four-cylinder engine where two cylinders are operational, without cylinder cut-off and with cylinder cut-off, based on the method according to the invention.

The curve 2 in FIG. 2 shows the torque band for the four-cylinder engine according to FIG. 1 which results when one cylinder pair, meaning two cylinders assigned to each other by firing interval of 360 degrees crank angle, are cut off by shutting down the fuel supply and the ignition while the gas exchange valves continue to be operated at the normal working cycle. The resulting curve shows a very irregular torque band and thus an erratic running of the piston internal combustion engine.

With a piston internal combustion engine provided with variably controlled, in particular fully variably triggered, gas exchange valves such as gas exchange valves with electromagnetic actuators, the method according to the invention results in a considerable improvement of the torque band when one cylinder pair is shut down, even on a four-cylinder piston internal combustion engine, as shown with the curve 3 in FIG. 2.

When cutting off the cylinders in accordance with the inventive method, for example, the intake valves are maintained in the closed state when generating a predetermined charge quantity using exhaust gas and exhaust gas is sucked in during the shut-down state with the respectively first downward movement of the pistons for this cylinder pair. The charge quantity can be determined via the opening length. As soon as the predetermined charge quantity is reached, the gas exchange valves are also closed and will remain in the closed state for the duration of the cut-off phase, so that the charge quantity in both non-fired cylinders of the cut-off cylinder pair is respectively compressed during the upward movement of the piston. A negative torque is thus exerted onto the crankshaft if the corresponding cylinder of the fired cylinder pair travels the expansion stroke. The charge quantity that is taken in can respectively expand during the piston passage through the top dead center, so that a positive torque acts upon the crank shaft if the corresponding cylinder of the fired cylinder pair travels the compression stroke. The curve 3 in FIG. 2 shows that owing to the firing interval of 360° that is specified for the associated cylinders of the cylinder pairs, a noticeably more uniform torque band results for the complete engine, given the corresponding firing sequence.

It can be deduced from this that a relatively uniform torque band can be achieved for the partial-load operation with the method according to the invention, even for a four-cylinder piston internal combustion engine, if one cylinder pair is cut off and the fired cylinder pair is operated practically under full-load conditions with optimum combustion curves. Nonetheless, the engine on the whole only releases a partial load.

In the same way, fresh air can also be specified instead of exhaust gas for the charge quantity of the cut-off cylinder pair, wherein this only results in a different control scheme for actuating the gas exchange valves.

FIG. 3 shows a diagram for the "exhaust gas operation" of a four-cylinder, four-cycle piston internal combustion engine with the cylinders or a cylinder pair assigned to each other by firing interval of 360° and a firing sequence of 1–3–4–2. The cut-off period is herein outlined with a border.

The following applies in this diagram:
K—compression stroke
E—expansion stroke
A—discharge stroke
S—intake stroke and furthermore also:
AS—exhaust gas intake stroke
k—exhaust gas (air) compression and
e—exhaust gas (air) expansion If the cylinder pair that consists of cylinders 2 and 3 must be shut down for a partial load operation during the operating cycles 6 to 15, then the gas exchange valve remains open during cycle 5, following the discharge stroke, to allow the intake of exhaust gas. The gas intake valve and the gas discharge valve remain closed during the following cycles 6 to 15.

The expansion stroke for the cylinder 2 to be shut down takes place during the exhaust gas intake stroke of cylinder 3, so that the exhaust gas valve is kept closed during the cycle 6 already and the charge quantity taken in during the expansion stroke remains inside the cylinder 2.

To fire up this cylinder pair for a full-load operation starting with the operating cycle 16, it is necessary to trigger the gas exchange valves starting with cycle 14 during normal operations while the cylinder 3 goes through one more expansion and compression with the gas exchange valves remaining closed. The gas exchange valves of cylinder 3 are not actually triggered in the normal operating cycle until the operating cycle 16.

FIG. 4 contains the diagram for the air compression during the same cut-off period, also outlined with a border, wherein this period ranges from operating cycle 5 to operating cycle 15. In this case, the fuel supply to the cylinder 3 is cut off starting with the beginning of the intake stroke during operating cycle 5, so that (practically) only air is taken in and the charge quantity can be compressed and expanded starting with the operating cycle 6 while the gas exchange valves remain closed. The gas discharge valve can thus be driven in the "normal operation" for the transition to the full-load operation in the operating cycle 16.

The shut-down of the gas exchange valve triggering is correspondingly delayed for the cylinder 2. The fuel supply is cut off at the start of the operating cycle 7, so that the gas exchange valves remain closed following the intake stroke during the operating cycle 8. For the transition, the gas exchange valves are again triggered during normal operations, starting with the operating cycle 14.

Figure 5:
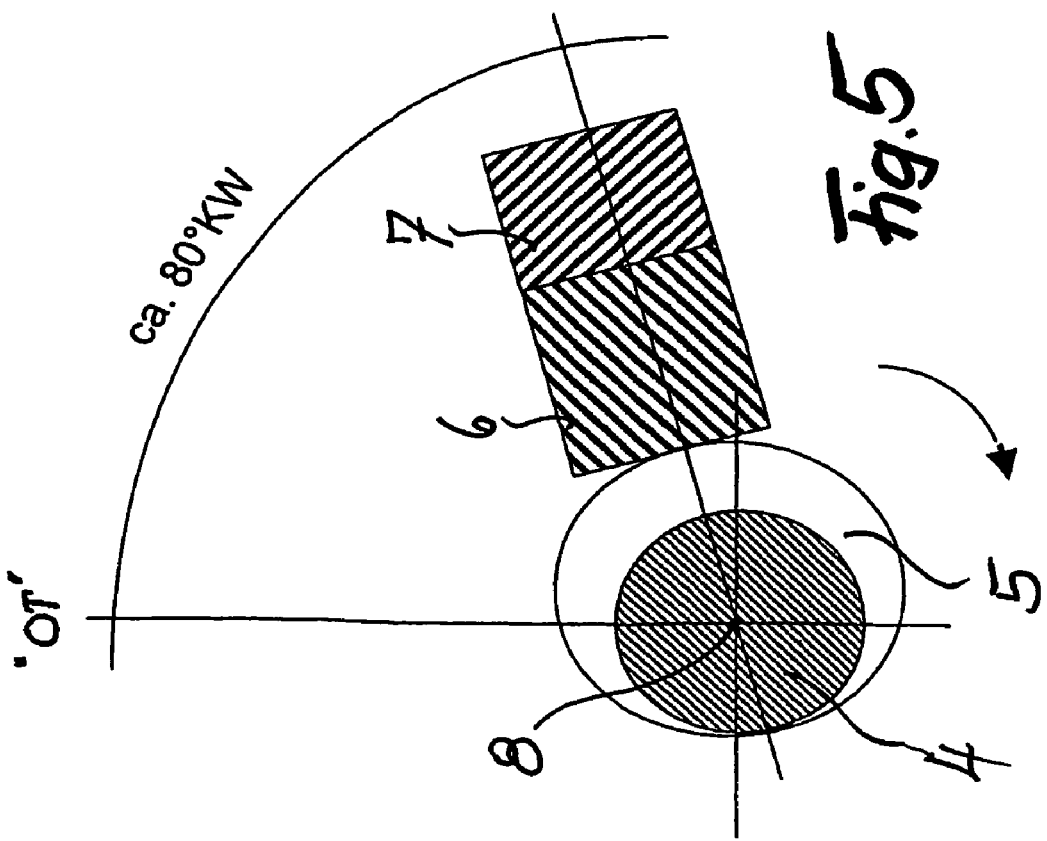
FIG. 5 is a schematic showing an arrangement for an additional mechanical torque compensation.

To further even out the torque band during the cylinder cut-off, it is advantageous if a periodically changing torque is additionally applied to the crank shaft, for example as shown in FIG. 5, by absorbing and re-introducing a corresponding force at a cam 5 which is attached to the crank shaft 4 by means of a tappet 6 and a preloaded spring 7. The vertex of the eccentricity in this case occurs approximately at 80° crank angle beyond the top dead center of the fired cylinder, so that during the expansion cycle of the respectively fired cylinder, a portion of the energy is taken up by the preloaded spring 7 and is released again during the transition to the exhaust cycle.

Figure 6:
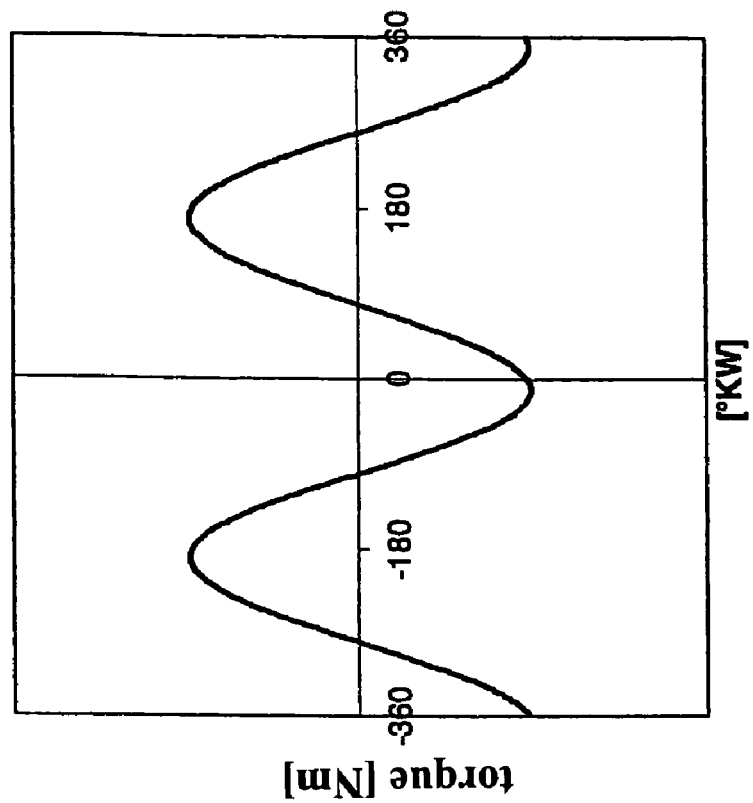
FIG. 6 is a diagram showing a curve for a compensation moment in dependence on the crank angle degree.

The control curve for cam 5 is configured so as to achieve the torque band shown in FIG. 6 which must be generated additionally with the arrangement according to FIG. 5. This additionally generated torque band has a negative moment during the compression and expansion of the fired cylinders and, as a result of the firing interval, has a positive moment during the compression and expansion of the shutdown cylinders. A superimposing of these moments results in a further evening out of the torque band, as illustrated with the curve 3.1 in FIG. 1.

The spring force of preloaded spring 7 must be designed to be adjustable for influencing the torque at different loads of the fired cylinders. The angle of maximum spring deflection and thus the highest cam pitch on the crank shaft must be selected such that for this crankshaft setting, the compression and expansion of the fired cylinders is essentially finished, wherein this occurs approximately at an 80° crank angle following the top dead center. (OT).

A different option for additionally generating a periodically changing torque is provided when using the periodic torque operation of an electric machine, connected to the piston internal combustion engine, and a corresponding energy storage unit which briefly takes up the torque and/or briefly removes a load and subsequently releases it. Batteries or even capacitors can be used for this, which are connected to an electric machine that can be operated either as a generator or a motor.

In particular with fully variably controlled gas exchange valves, the respectively remaining charge quantity can also be varied by changing the point in time when the gas discharge valves and/or the gas intake valves are cut off.

Closing the "intake" valves at the start of the cylinder cut-off, at a point in time close to the bottom dead center, results in a high charge utilization of the cylinders which compress and expand on the average without moment output. By closing the valve or the last of the still open "intake" valves at a point in time before or after the bottom dead center, the charge quantity is changed and thus also the compression level to be achieved in the cut-off or non-fired cylinders. A brief opening and closing of one or several of the "intake" valves at a point in time near the bottom dead center also causes an intake of air or exhaust gas, thus compensating the charge component that has escaped from the cylinder as a result of blow-by losses. Following the replenishing of the cylinder charge for compensating blow-by losses or following a change in the charge quantity is possible with every 360° crank angle or can be limited to each $n^{th}$ operating cycle. The level of charge use increases with the load of the fired cylinders.

The above-described measures for improving the torque band of four-cycle piston internal combustion engines which are respectively provided with cylinder pairs having cylinders assigned to each other by a firing interval of 360° can be used in the same way for piston internal combustion engines having 8, 12 or 16 cylinders. Accordingly, with an eight-cylinder engine two cylinder pairs are cut off, with a twelve-cylinder engine three cylinder pairs are cut off, and with a sixteen-cylinder engine four cylinder pairs are cut off, with each pair having a top dead center at the same crank angle. The cylinders to be cut off are cylinders with the same firing interval which is twice as long as the one for the full operation.

The engine control unit can be configured such that once a predetermined period for the partial load operation is exceeded, the cylinder cut-off changes from one cylinder pair to the other cylinder pair, so that a minimum temperature level is maintained for the respectively cut off cylinder pairs and so that during the transition from the partial-load operation to the full-load operation, the respectively cut off cylinder pair reaches its operating temperature as quickly as possible.

The invention has been described in detail with respect to referred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A method for improving the torque band of a multi-cylinder, four-cycle piston internal combustion engine comprising at least two cylinder pairs including fully variably triggered gas exchange valves, wherein each cylinder pair comprises two cylinders associated with each other by a firing interval of 360° crank angle, and wherein one cylinder pair is not fired by cutting off the fuel supply and acting upon the gas exchange valves resulting in a partial load operation, the method comprising:
   triggering the cylinders of the non-fired cylinder pair during the partial load operation so that the cylinders of the non-fired cylinder pair take in a predetermined charge quantity for adjusting a predetermined compression level that influences the torque band; and
   maintaining the gas exchange valves of the non-fired cylinders closed for the duration of the partial-load operation.

2. The method according to claim 1, wherein the triggering step includes triggering the gas exchange valves during the piston passage through bottom dead center in dependence on at least one of the load, the speed or the torque band for adjusting the predetermined charge quantity.

3. The method according to claim 1, further including exerting an additional torque which is adapted to the fired cylinders onto the crank shaft for generating the torque band.

4. The method according to claim 1, wherein gas exhaust is used for the predetermined charge quantity, and the method further comprises;
   transitioning the cylinders of the one cylinder pair from fired to non-fired operation by maintaining the gas intake valves of the one cylinder pair closed and opening the gas discharge valves of the one cylinder pair during the intake stroke so that the exhaust gas is suctioned in for the charge quantity; and
   transitioning the cylinders of the one cylinder pair from the non-fired to the fired operation by triggering the gas exchange valves of the non-fired cylinders during the regular operating cycle that corresponds to full-load operation and introducing the fuel into the cylinders of the one cylinder pair in accordance with a regular firing sequence.

5. The method according to claim 1, wherein fresh air is used for the predetermined charge quantity, and the method further comprises:

transitioning the cylinders of the one cylinder pair from fired to non-fired operation by maintaining the gas discharge valves closed and opening the gas intake valves during the intake stroke for suctioning in fresh air for the charge quantity; and transitioning the cylinders of the one cylinder pair from the non-fired to the fired operation by triggering the gas exchange valves of the non-fired cylinders during the regular operating cycle corresponding to full-load operation and introducing the fuel into the cylinders of the one cylinder pair in accordance with a regular firing sequence.

6. The method according to claim 1, further comprising the step of briefly opening at least one of the associated gas intake valve and gas discharge valve to influence the charge quantity during the piston passage through bottom dead center.

7. A method for improving the torque band of a multi-cylinder, four-cycle piston internal combustion engine comprising at least two cylinder pairs including variably triggered gas exchange valves, wherein each cylinder pair comprises two cylinders associated with each other by a firing interval of 360° crank angle, and wherein one cylinder pair is not fired by cutting off the fuel supply and acting upon the gas exchange valves resulting in a partial load operation, the method comprising:

triggering the cylinders of the non-fired cylinder pair during the partial load operation so that the cylinders of the non-fired cylinder pair take in a predetermined charge quantity for adjusting a predetermined compression level that influences the torque band; and maintaining the gas exchange valves of the non-fired cylinders closed for the duration of the partial-load operation and opening only briefly at least one of the associated gas intake valve and gas discharge valve to influence the charge quantity during the piston passage through bottom dead center;

wherein the triggering step includes triggering the gas exchange valves during the piston passage through the bottom dead center in dependence on at least one of the load, the speed or the torque band for adjusting the predetermined charge quantity.

8. A method for improving the torque band of a multi-cylinder, four-cycle piston internal combustion engine comprising at least two cylinder pairs including variably triggered gas exchange valves, wherein each cylinder pair comprises two cylinders associated with each other by a firing interval of 360° crank angle, and wherein one cylinder pair is not fired by cutting off the fuel supply and acting upon the gas exchange valves resulting in a partial load operation, the method comprising:

triggering the cylinders of the non-fired cylinder pair during the partial load operation so that the cylinders of the non-fired cylinder pair take in a predetermined charge quantity for adjusting a predetermined compression level that influences the torque band, wherein gas exhaust is used for the predetermined charge quantity;

maintaining the gas exchange valves of the non-fired cylinders closed for the duration of the partial-load operation and opening only briefly at least one of the associated gas intake valve and gas discharge valve to influence the charge quantity during the piston passage through bottom dead center;

transitioning the cylinders of the one cylinder pair from fired to non-fired operation by maintaining the gas intake valves of the one cylinder pair closed and opening the gas discharge valves of the one cylinder pair during the intake stroke so that the exhaust gas is suctioned in for the charge quantity; and transitioning the cylinders of the one cylinder pair from the non-fired to the fired operation by triggering the gas exchange valves of the non-fired cylinders during the regular operating cycle that corresponds to full-load operation and introducing the fuel into the cylinders of the one cylinder pair in accordance with a regular firing sequence.

* * * * *